(12) United States Patent
Chang et al.

(10) Patent No.: US 6,931,739 B2
(45) Date of Patent: Aug. 23, 2005

(54) MULTIDIRECTIONAL LASER INDICATOR

(75) Inventors: Shih-Chang Chang, TaiNan (TW); Sheng-Ching Wu, Keelung (TW)

(73) Assignee: Quarton, Inc. (TW)

( * ) Notice: Subject to any disclaimer, the term of this patent is extended or adjusted under 35 U.S.C. 154(b) by 0 days.

(21) Appl. No.: 10/794,677

(22) Filed: Mar. 5, 2004

(65) Prior Publication Data

US 2004/0177523 A1 Sep. 16, 2004

(30) Foreign Application Priority Data

Mar. 11, 2003 (TW) ........................................ 92203634 U (51) Int. Cl.[7] .......................... G01C 15/00; G01B 11/26
(52) U.S. Cl. ........................ 33/286; 33/283; 33/DIG. 21
(58) Field of Search ............................. 33/286, 276, 277, 33/281, 282, 283, 285, 290, 291, DIG. 21

(56) References Cited

U.S. PATENT DOCUMENTS

| | | | | |
|---|---|---|---|---|
| 5,539,990 A | * | 7/1996 | Le ................................ 33/283 |
| 6,035,540 A | * | 3/2000 | Wu et al. ....................... 33/286 |
| 6,202,313 B1 | * | 3/2001 | Yamashita ..................... 33/286 |
| 6,618,950 B2 | * | 9/2003 | Huang et al. .................. 33/286 |
| 2003/0000094 A1 | * | 1/2003 | Tamamura ..................... 33/286 |

* cited by examiner

*Primary Examiner*—Christopher W. Fulton
(74) *Attorney, Agent, or Firm*—Raymond Sun (57) ABSTRACT

A laser indicator includes a weight mechanism having a bracket with a weight secured to the bracket in a manner where the weight is suspended by gravity. A plurality of laser generators are arranged about the weight, including a horizontal beam generator, a center laser generator arranged at the axial center of the bottom of the weight for emitting a laser point coaxial to the axial line of the weight, and a plurality of vertical beam generators positioned in spaced-apart manner around the axial center of the weight at the top of the weight. The laser indicator can include a stand that includes a seat having a plurality of legs, and a rotary table having a plurality of legs, with the weight mechanism coupled to the rotary table, and the rotary table removably coupled to the seat so that altitude of the weight mechanism can be adjusted. In addition, the laser indicator can include a securing mechanism for coupling the weight to the upper bracket of the bracket.

7 Claims, 10 Drawing Sheets

MULTIDIRECTIONAL LASER INDICATOR

BACKGROUND OF THE INVENTION

1. Field of the Invention

The present invention relates to a multidirectional laser indicator, and in particular, to a multidirectional laser indicator having a simplified adjustment method for adjusting a laser module.

2. Description of the Prior Art

There are many kinds of multidirectional laser indicators available in the current market. One example is illustrated in Republic of China (Taiwan) Patent No. 329,303, entitled "Laser Leveler of Automatic Horizontal Calibration Capability and Convenient Displacement Adjustment", which has laser units arranged at the front and the four sides (upper, lower, left, and right side) of the projecting platform of the laser leveler for forming a crossing projection using a horizontal and a vertical projecting line, a left and a right vertical projecting line, and upper and lower projecting points.

Figure 1:
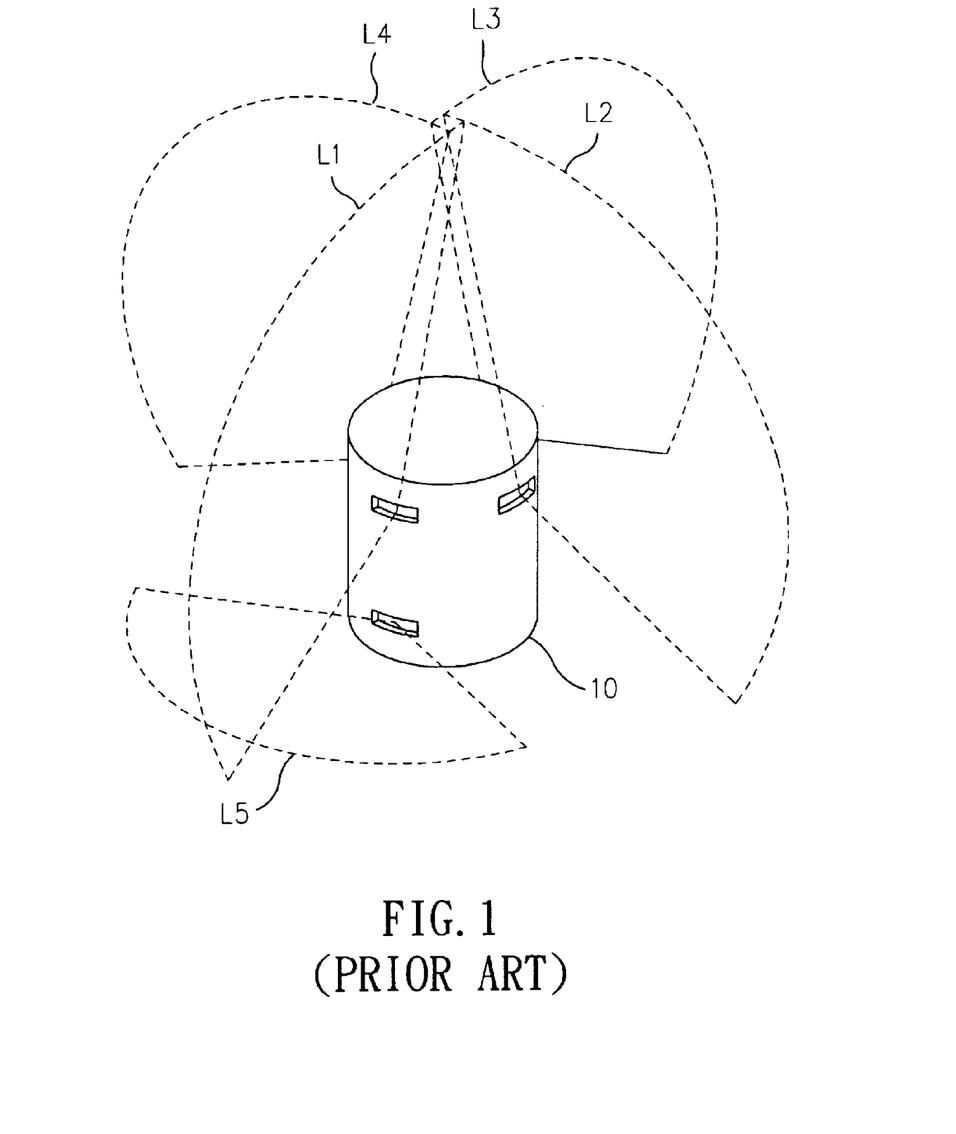
FIG. 1 illustrates the projecting states of a conventional multidirectional laser indicator.

Another example is illustrated in Republic of China (Taiwan) Patent No. 391,913, entitled "Ink Line Maker", which has a vertical projector and a horizontal projector, with which a normal degree may be measured. If four sets of vertical laser modules are installed in the apparatus and are arranged symmetrically, then the four sets of vertical laser modules may project four vertical lines. This is shown in FIG. 1 of the present application, where the laser indicator 10 projects four vertical laser beams L1–L4 and one horizontal laser beam L5. An ideal situation is for the four vertical laser beams L1–L4 to join with each other at the top of the laser indicator 10, with the vertical laser beam L1 intersecting perpendicularly with the horizontal laser beam L5. Unfortunately, since the laser module is prone to experience displacement after extended use, not only will the horizontal laser beam L5 be skewed (i.e., no longer horizontal), but the four vertical laser beams L1–L4 may also be unable to be joined at one point. As a result, the laser module will need to be re-calibrated.

Figure 2A:
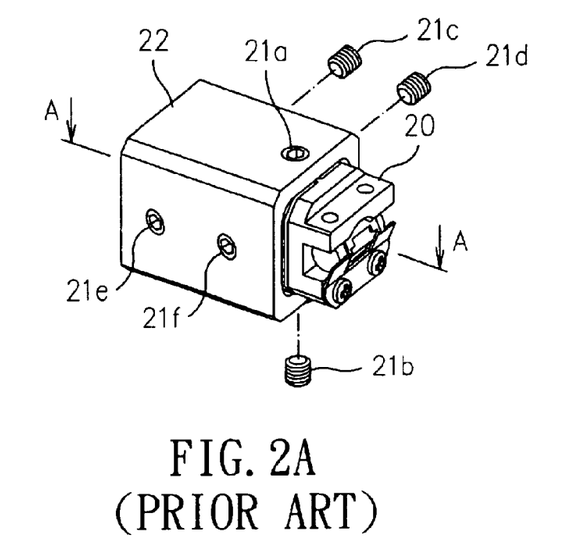
FIG. 2A is a perspective view of a conventional adjustment structure of a conventional laser module.
Figure 2B:
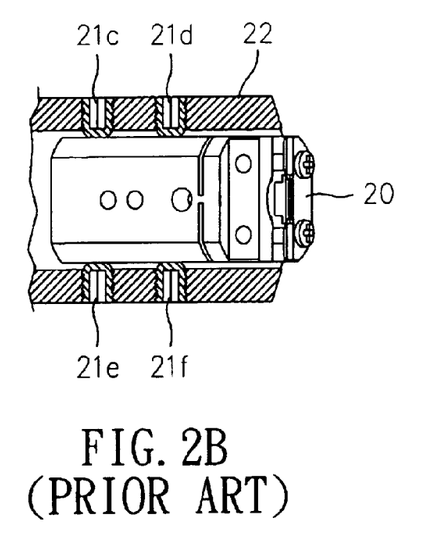
FIG. 2B is a cross-sectional view taken along line A—A of FIG. 2A.

FIGS. 2A and 2B illustrate a conventional calibration method. The laser module 20 is generally arranged inside a shell 22 having adjusting bolts 21a, 21b installed on the upper side and the lower side of the shell 22, respectively. One of two sets of adjusting bolts 21c+21d and 21e+21f is installed on each side of the shell 22, with all the adjusting bolts 21a–21f threaded through the shell 22 and contacting the laser module 20. As a result, the laser module 20 can be rotated and displaced by rotating the adjusting bolts 21a–21f so that the position of the laser module 20 can be calibrated. However, the major shortcoming of this six-point adjusting method is that it is very time-consuming and difficult to properly implement. The adjustment can be very tedious, especially for an indicator that has four laser modules. Furthermore, by providing six adjusting bolts in a laser module 20, the material cost is increased as well.

SUMMARY OF THE INVENTION

It is an object of the present invention to provide a multidirectional laser indicator which allows for quick and easy adjustment of the direction of the laser module.

It is another object of the present invention to provide a multidirectional laser indicator which has a detachable stand that is adaptable for many different altitudes of measuring environment.

It is yet another object of the present invention to provide a multidirectional laser indicator where the relative position between the weight mechanism and the stand remains stationary.

In order to achieve the objectives of the present invention, there is provided a laser indicator having a weight mechanism having a bracket with a weight secured to the bracket in a manner where the weight is suspended by gravity. A plurality of laser generators are arranged about the weight, including a horizontal beam generator, a center laser generator arranged at the axial center of the bottom of the weight for emitting a laser point coaxial to the axial line of the weight, and a plurality of vertical beam generators positioned in spaced-apart manner around the axial center of the weight at the top of the weight.

In accordance with one embodiment of the present invention, each of the horizontal beam generator and vertical beam generators has a supporting seat and a laser module positioned inside the supporting seat to project a laser beam parallel to the axial line of the weight. The laser module has a front portion, a lens, a pivot axis whose axial center extends towards the center of the lens of the respective laser module, and a plurality of adjusting bolts that extend through the respective supporting seat to contact against the respective laser module. The front portion of each laser module is positioned using the pivot axis such that, when the adjusting bolts of the particular laser module are rotated, the laser module will rotate about the pivot axis so as to adjust the projecting angle of the laser beam being emitted.

In accordance with another embodiment of the present invention, a stand is provided which includes a seat having a plurality of legs, and a rotary table having a plurality of legs, with the weight mechanism coupled to the rotary table, and the rotary table removably coupled to the seat so that altitude of the weight mechanism can be adjusted.

In accordance with yet another embodiment of the present invention, the laser indicator further includes a securing mechanism for coupling the weight to the upper bracket of the bracket.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 3:
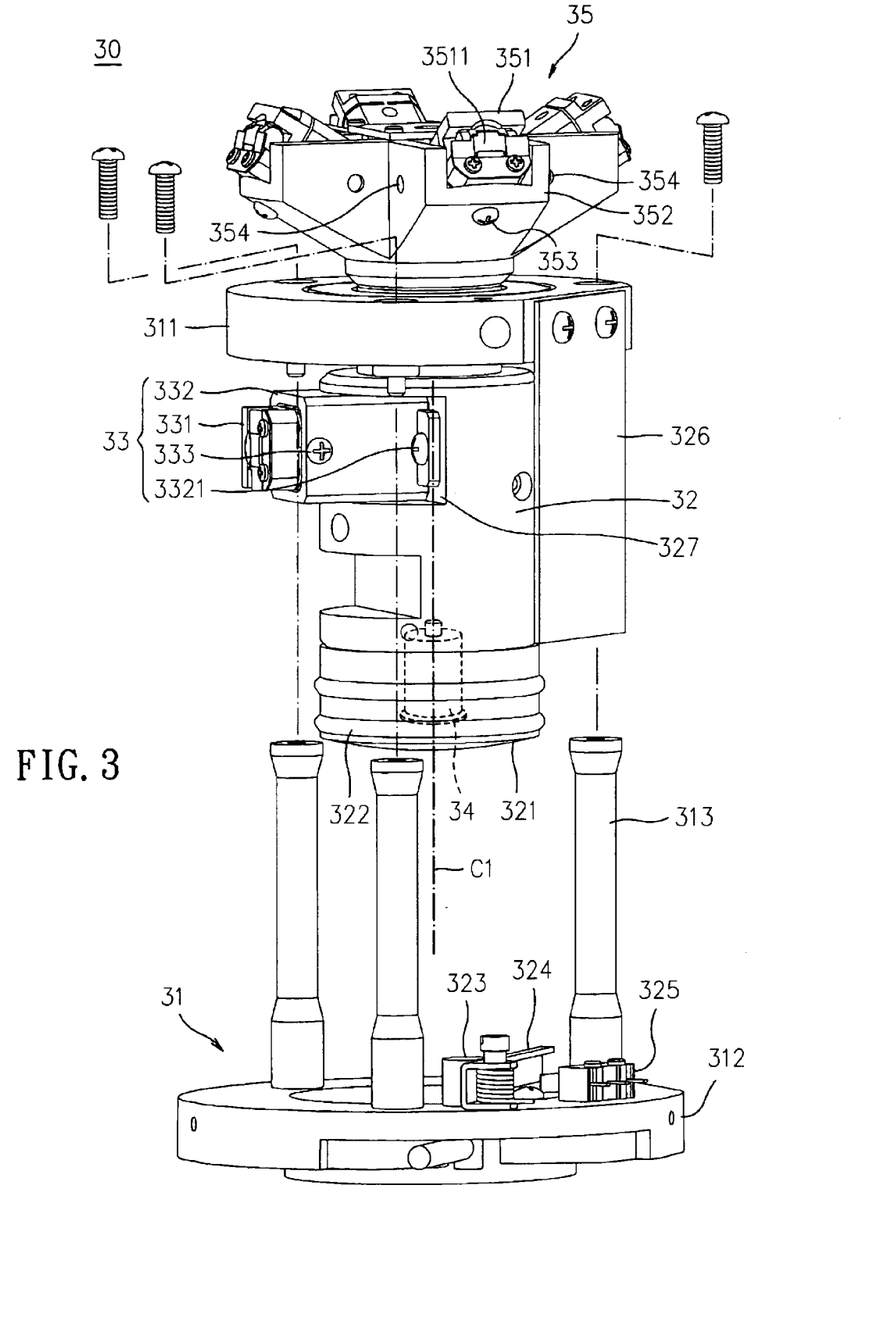
FIG. 3 is an exploded perspective view of a laser indicator according to the present invention.

FIG. 3 illustrates a weight mechanism 30 according to the present invention. The weight mechanism 30 includes a bracket 31, which includes an upper bracket 311, a lower bracket 312, and a plurality of supporting struts 313 between the upper bracket 311 and the lower bracket 312. A weight 32 is installed inside the bracket 31, with the weight 32 being suspended naturally by gravity (i.e., like a pendulum) so as to maintain a constant normal between the axial line C1 of the weight 32 and the measuring plane. A stop ring 321 is provided at the bottom of the weight 32, with a conductive ring 322 fitted at the exterior of the weight 32 adjacent the stop ring 321. The conductive ring 322 cooperates with the components arranged on the lower bracket 312, such as a switching cam 323, a stop arm 324, and a micro switch 325, and also cooperates with a magnetic device (not shown in the figures) arranged in the lower bracket 312, and a circuit device 326 arranged at a side of the upper bracket 311. The magnetic device cooperates with the stop ring 321 to stabilize the pendulous weight 32 using techniques well-known in the art.

A plurality of laser generators are arranged on the weight 32, and include a horizontal beam generator 33 capable of emitting horizontal laser, a laser generator 34 arranged at the axial center of the bottom of the weight 32 for emitting a laser point coaxial to the axial line C1 of the weight 32, and four sets of vertical beam generators 35 arranged at the top of the weight 32. Each of the four sets of vertical beam generators 35 includes a laser module 351 and a supporting seat 352. Each supporting seat 352 has a crisscross shape and is upwardly skewed at a designated angle for supporting the corresponding laser module 351 in a manner such that all the laser modules 351 are evenly arranged around the axial center of the weight 32. Each laser module 351 has a bar-shaped lens 3511 for emitting laser in an outward manner towards the principal azimuth; in this regard, the laser module 351 may project a laser beam parallel to the axial line C1 of the weight 32.

Figure 4:
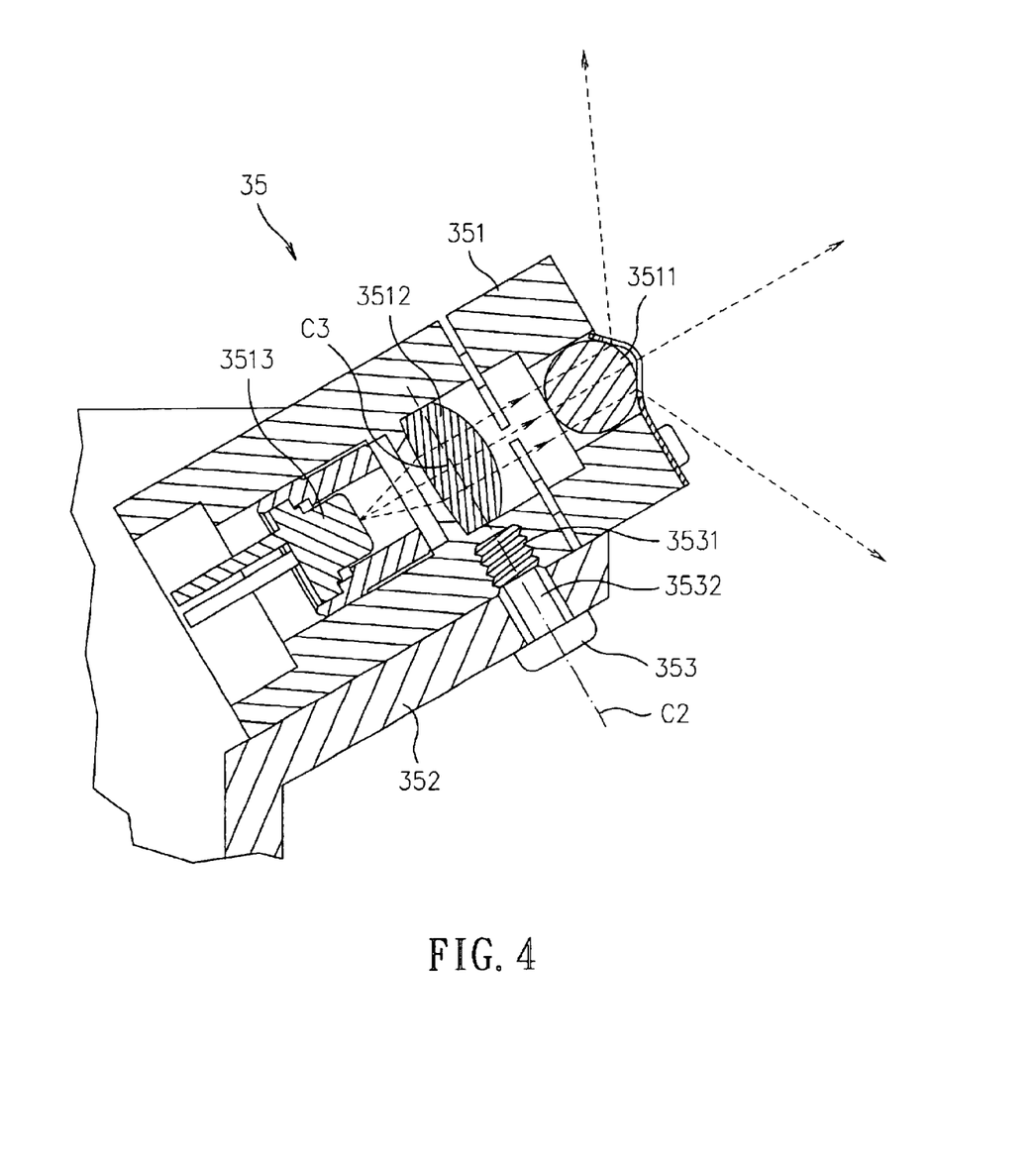
FIG. 4 is a cross-sectional view of a vertical beam generator of the laser indicator of FIG. 3.
Figure 5:
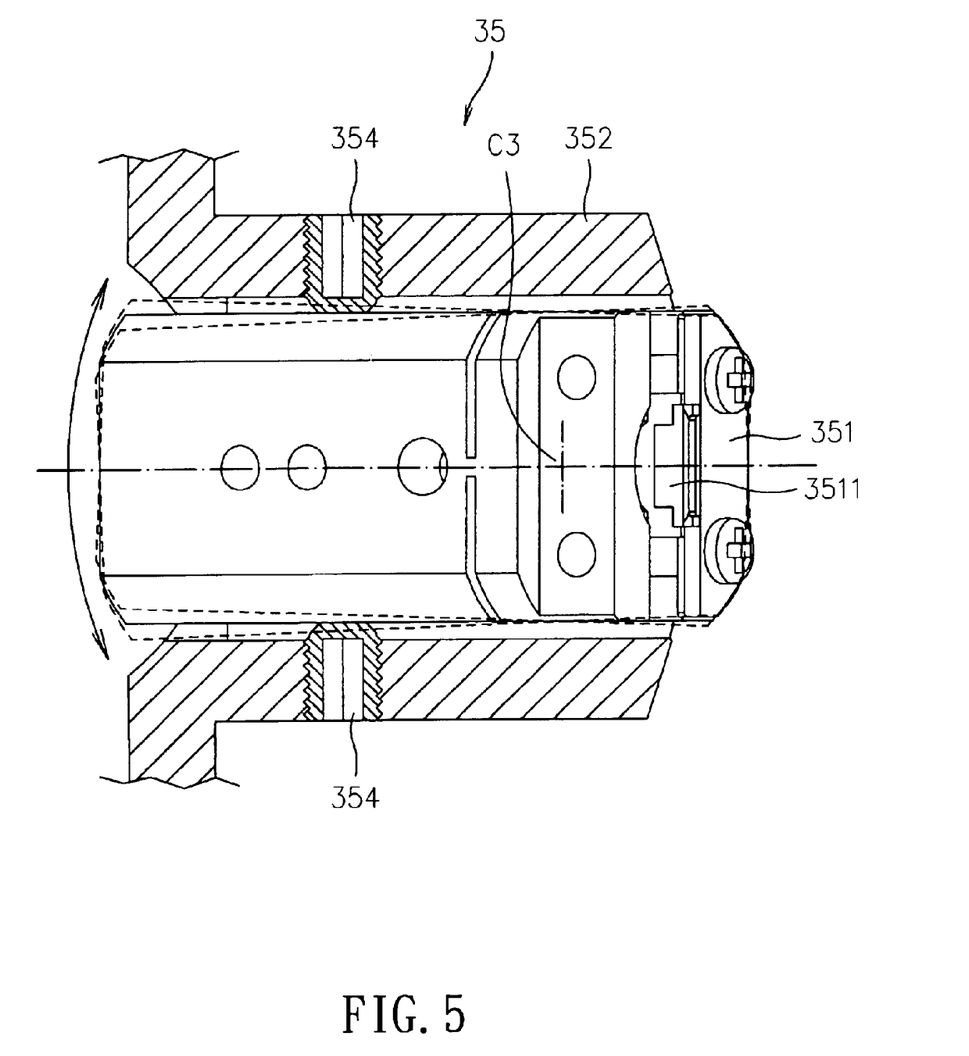
FIG. 5 is a partial transverse sectional view of the vertical beam generator of FIG. 4.

Referring now to FIGS. 3–5, each vertical beam generator 35 has a pivot bolt 353 that is provided at the bottom of the laser module 351, and the pivot bolt 353 is inserted into the laser module 351 from the exterior of the supporting seat 352. As shown in FIG. 4, a threaded section 3531 is provided on the inner end of the pivot bolt 353 threadably engaging the laser module 351, and the middle section 3532 of the pivot bolt 353 acts as a pivot and penetrates the supporting seat 352. The axial center C2 of the pivot bolt 353 extends towards the center of the thickness (i.e., the depth) of the focusing lens 3512 of the laser module 351 and forms an intersection point C3 with the center of the thickness of the focusing lens 3512. In addition, as shown in FIG. 5, an adjusting bolt 354 is threadably inserted through each of the two sides of the supporting seat 352 and contacts with a corresponding side of the laser module 351.

Thus, one characteristic of the present invention is to employ the pivot bolt 353 as a pivot axis of the laser module 351. Since the laser beam emitted from the laser diode 3513 is designed to pass through the center of the focusing lens 3512, therefore, when the adjusting bolts 354 located at two sides of the laser module 351 are rotated, the laser module 351 will be rotated as well using the intersection point C3 as a rotating center (because the center of the thickness of the focusing lens 3512 is aligned with the pivot bolt 353). In another words, the present invention can directly enable a rotating movement of the laser module 351 without experiencing undesirable displacement, so that the present invention simplifies the adjusting procedure and thereby saves the adjustment time.

Figure 6A:
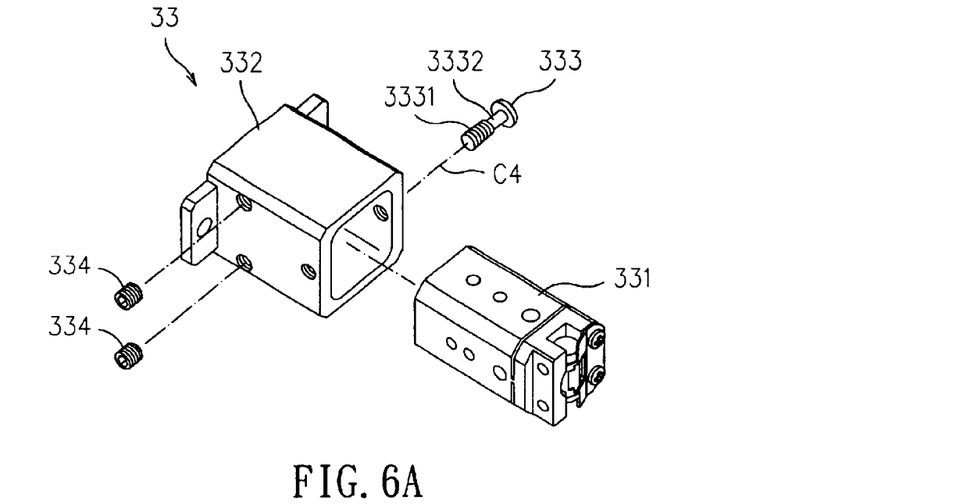
FIG. 6A is an exploded perspective view of a horizontal beam generator of the laser indicator of FIG. 3.
Figure 6B:
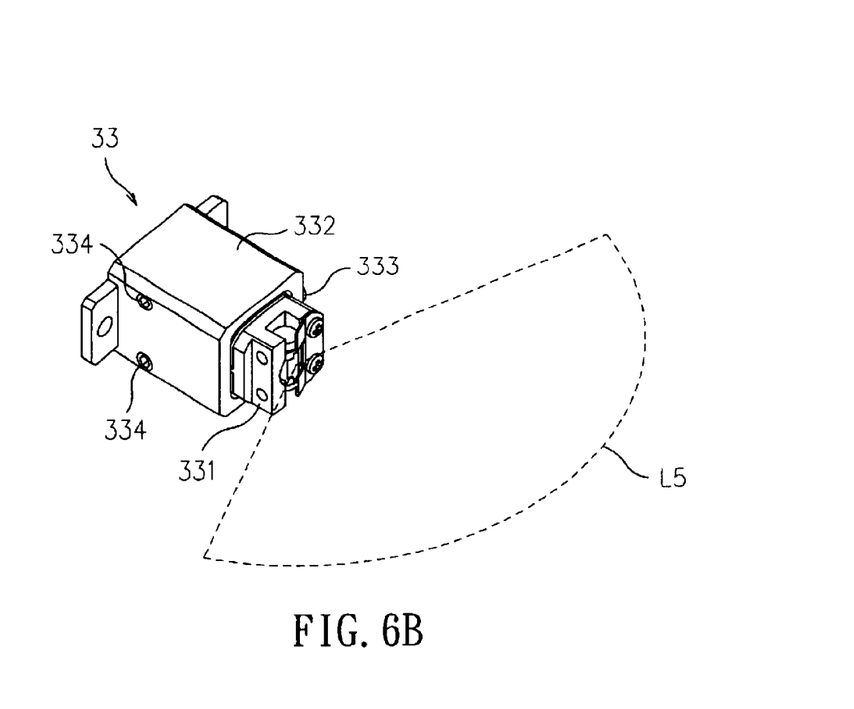
FIG. 6B is an assembled perspective view of the horizontal beam generator of FIG. 6A.

Referring to FIGS. 3 and 6A–6B, the horizontal beam generator 33 arranged at the middle section of the weight 32 has a laser module 331 and a supporting seat 332. The supporting seat 332 is connected to a groove 327 on the weight 32 via a bolt 3321, and the laser module 331 is secured inside the supporting seat 332. The adjustment mechanism for the horizontal beam generator 33 is similar to that of the vertical beam generator 35 described above. In other words, a pivot bolt 333 is provided at one side of the laser module 331 and threadably extended into the laser module 331 from the exterior of the supporting seat 332. A threaded section 3331 is provided on the inner end of the pivot bolt 333 for threadably engaging the laser module 331, and the middle section 3332 of the pivot bolt 353 acts as a pivot and penetrates the supporting seat 332. The axial center of the pivot bolt 333 extends towards the center of the thickness of the focusing lens (not shown, but can be the same as 3512) of the laser module 331 and forms an intersection point with the center of the thickness of the focusing lens. In addition, two adjusting bolts 334 are threadably inserted through one side of the supporting seat 332 (opposite the side of the other pivot bolt 333) and contact a side of the laser module 331. Thus, the pivot bolt 333 is employed as the pivot axis of the laser module 331, so that the laser module 331 will be rotated when the adjusting bolts 334 located at the other side of the laser module 331 are rotated. The horizontal beam generator 33 generates a horizontal laser beam L5 that is perpendicular to the axial line C1 of the weight 32.

Figure 7:
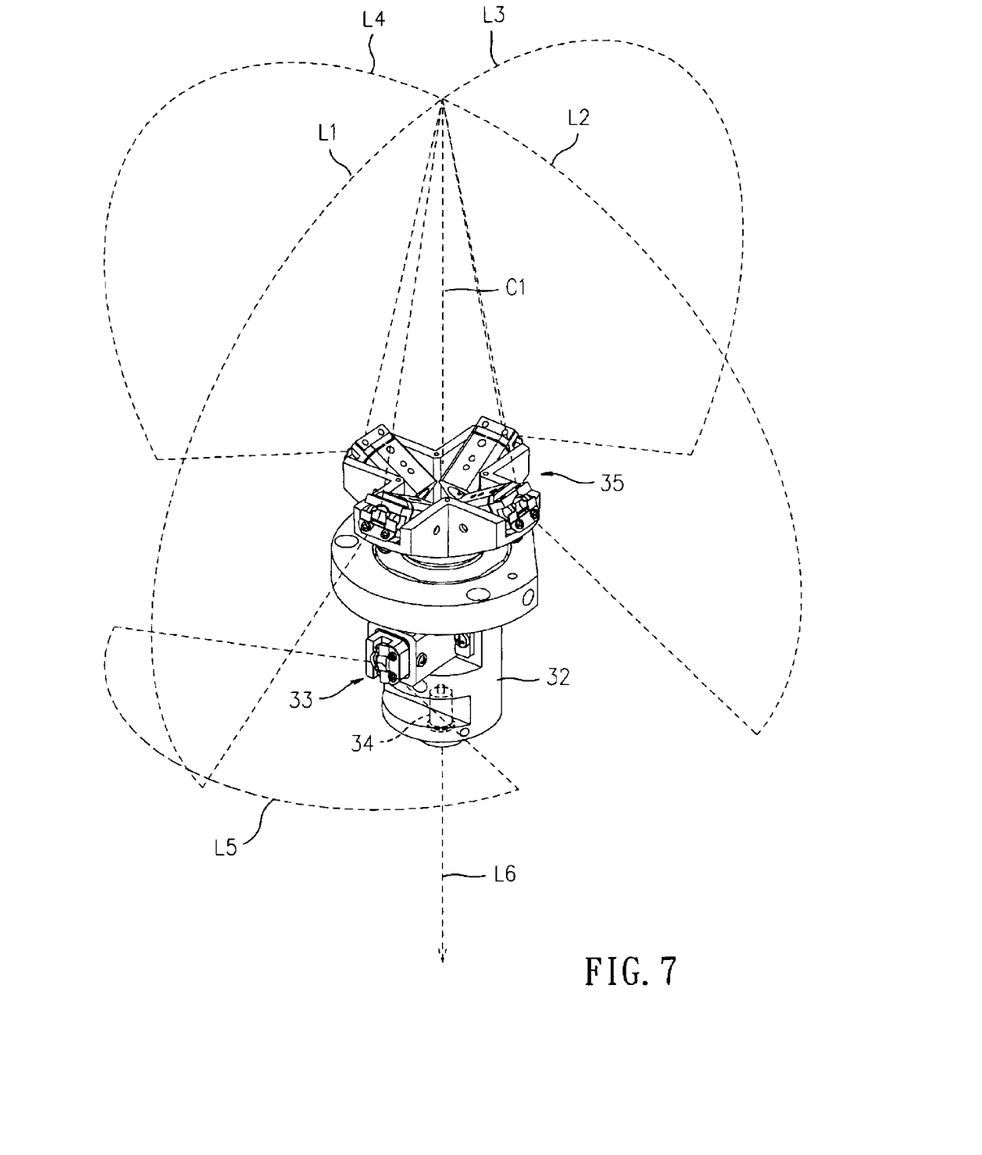
FIG. 7 illustrates the projecting states of the laser beams of the laser indicator of FIG. 3.

Referring now to FIG. 7, the laser generator 34 located at bottom of the weight 32 emits a downward laser point L6 co-axial to the axial central line C1 of the weight 32. The vertical laser beams L1–L4 generated by the four sets of vertical beam generators 35 not only are emitted toward the direction of the principal azimuth, but also intersect each other exactly at the axial central line C1 on top of the laser indicator 10. The horizontal laser beam L5 generated by the horizontal beam generator 33 intersects with the vertical laser beam L1 perpendicularly. The laser point L6 may be applied as a positioning reference for construction, and the horizontal laser beam L5 may be used for measuring the horizontal position of an object, with the vertical laser beams L1–L4 providing references for measuring a pillar.

Figure 8:
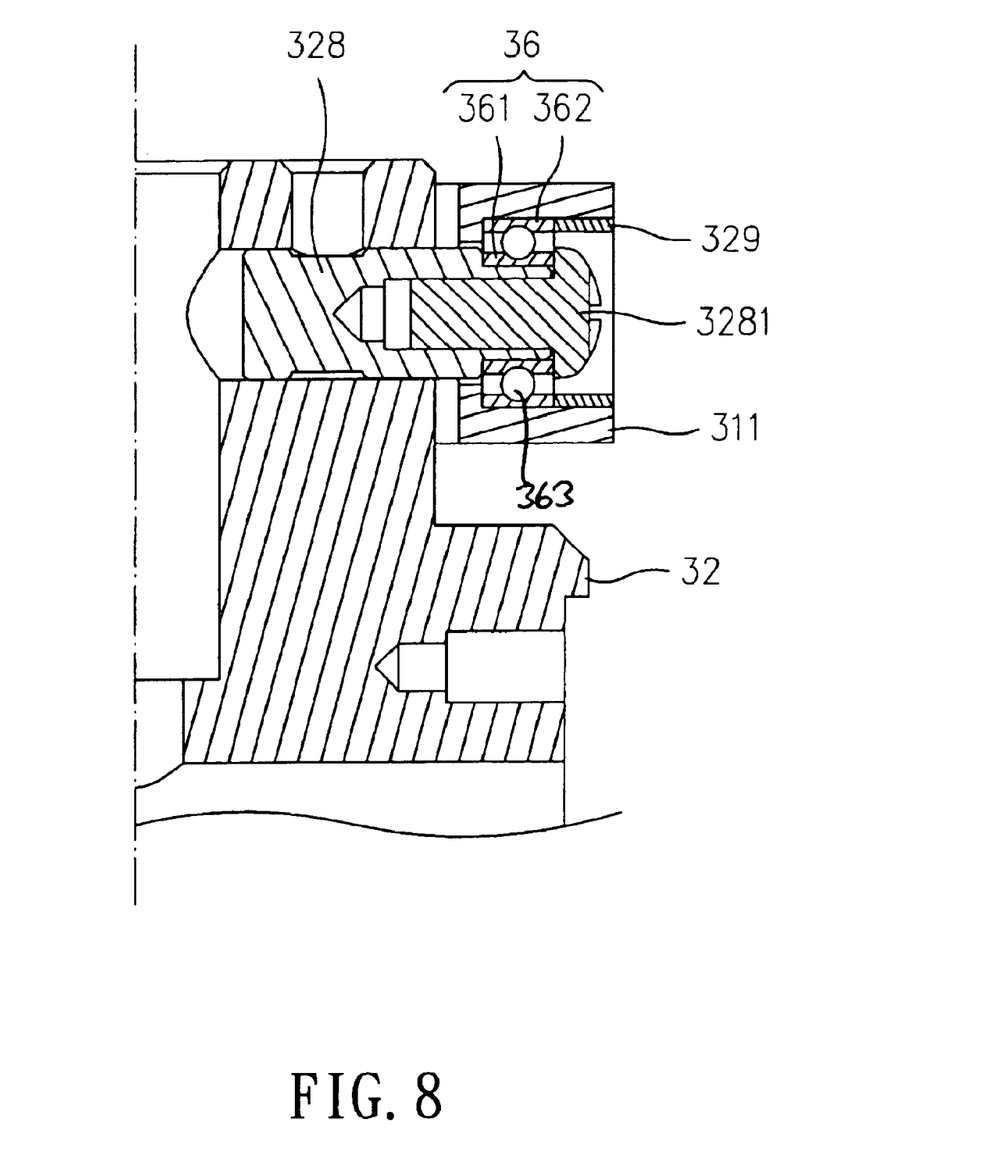
FIG. 8 is a cross-sectional view of a weight mechanism of the laser indicator of FIG. 3.

FIG. 8 illustrates a securing mechanism for coupling the weight 32 to the upper bracket 311. A bearing set 36 is installed in the upper bracket 311, and includes a bearings 363 sandwiched between inner ring 361 and an outer ring 362. A movable axial center 328 is installed in the weight 32 adjacent to the bearing set 36. One end of the movable axial center 328 extends through the weight 32, and another end of the movable axial center 328 extends through the upper bracket 311 and is abutted against the inner ring 361 of the bearing set 36. A fixing bolt 3281 is secured at the exterior of the movable axial center 328 for fixing the movable axial center 328 securely in the weight 32, and a fixing ring 329 is riveted to the exterior of the bearing set 36 of the upper bracket 311 and is abutted against the exterior of the outer ring 362 of the bearing set 36. This construction allows the relative position between the weight 32 and the bearing set 36 to remain stationary, and without any shift caused by constant rotation, since the inner ring 361 and the outer ring 362 of the bearing set 36 are positioned and secured by different components (i.e., the inner ring 361 is secured by the movable axial center 328, and the outer ring 362 is secured by the fixing ring 329).

Figure 9:
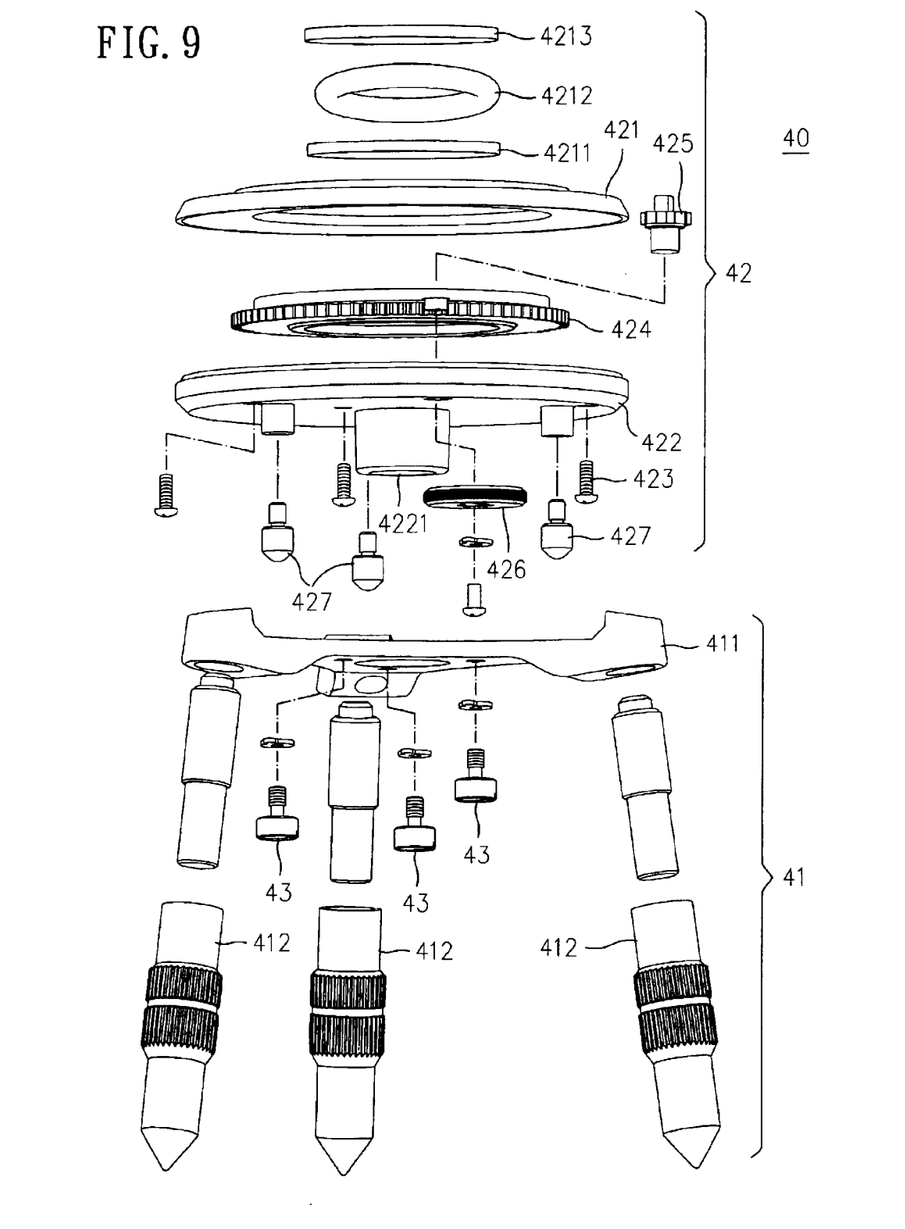
FIG. 9 is an exploded perspective view of a stand of the laser indicator of FIG. 3.
Figure 10:
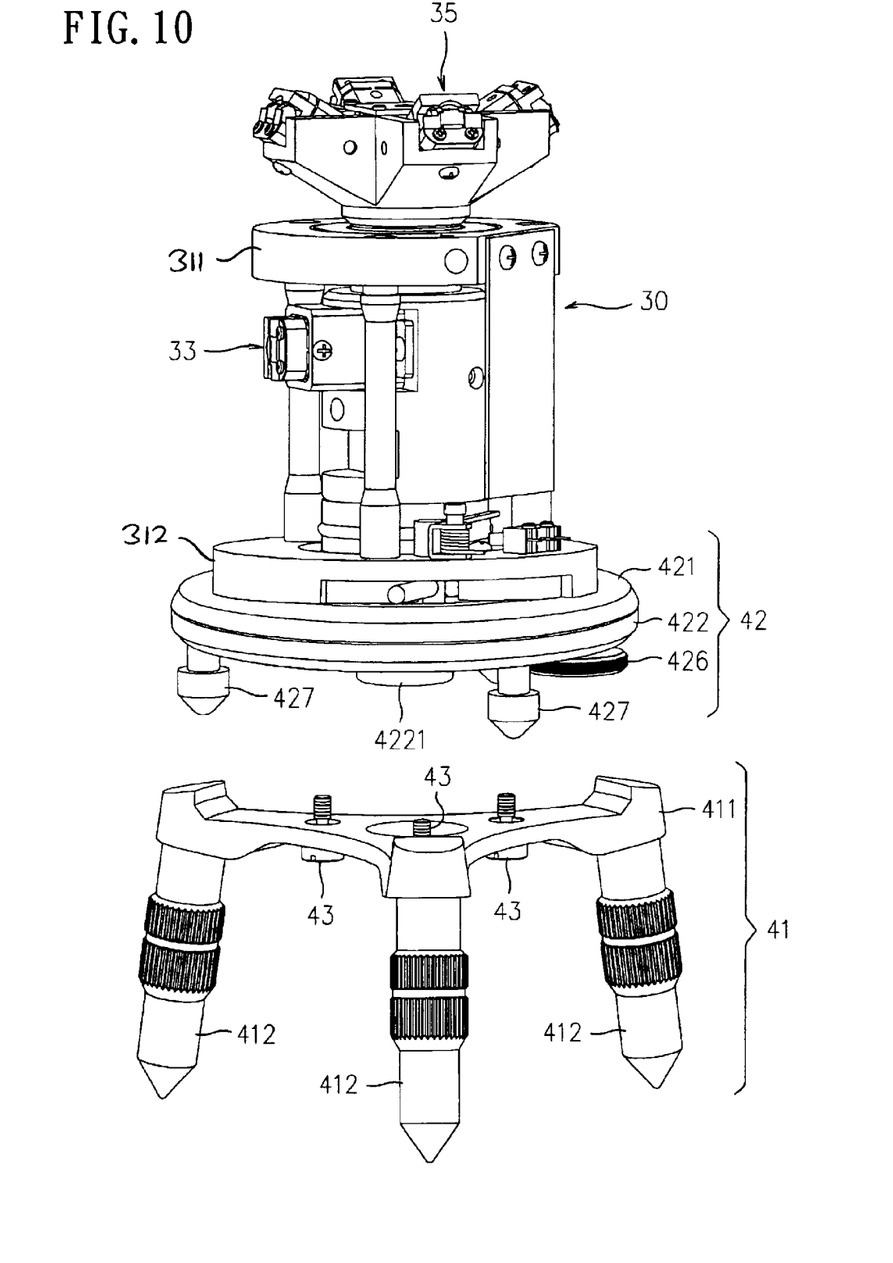
FIG. 10 is an exploded perspective view of the stand of FIG. 9 shown in use with the weight mechanism.

FIGS. 9 and 10 illustrate a stand 40 that is provided at the bottom of the weight mechanism 30 to support the weight mechanism 30. The stand 40 has a seat 41 and a rotary table 42. The seat 41 includes a frame 411 having a plurality of legs 412 arranged in spaced-apart manner at the bottom of the frame 411. The rotary table 42 includes an upper lid 421 and a lower lid 422 that are secured together by bolts 423. A rotary plate 424 is provided between the upper lid 421 and the lower lid 422 in a manner such that the rotary plate 424 is meshed with a transmission gear 425 which is in turn meshed with a micro-adjusting knob 426. The micro-adjusting knob 426, the transmission gear 425 and the rotary plate 424 together form a micro-adjusting mechanism. A glass 4211 is provided at the top of the rotary plate 424, with a washer 4212 and a pressing ring 4213 sealing the glass 4211 onto the rotary plate 424 so that the laser point emitted downwardly from the laser generator 34 shown in FIG. 3 can pass through and re-emerge from a hole 4221 located at a corresponding position in the lower lid 422. In addition, a plurality of legs 427 are provided in spaced-apart manner at the bottom of the lower lid 422, with the length of the legs 427 being shorter than the length of the legs 412 of the seat 41.

A bolt 43 secures the seat 41 and the rotary table 42 together, with the seat 41 located at the bottom of the rotary table 42, and with the legs 412, 427 facing downwardly.

As best shown in FIG. 10, the lower bracket 311 of the weight mechanism 30 is bolted to the rotary plate 424. When the micro-adjusting knob 426 is rotated, the transmission gear 425 will drive the rotary plate 424 to cause the weight mechanism 30 to rotate axially, such that the projecting directions of the horizontal beam generator 33 and the vertical beam generators 35 may be adjusted.

When the weight mechanism 30 is secured to the rotary plate 424 and the rotary table 42 is secured to the seat 41, the altitude of the weight mechanism 30 is increased. On the other hand, if the bolt 43 is released to separate the rotary table 42 from the seat 41, then the rotary table 42 alone can be used to support the weight mechanism 30, with the legs 427 of the rotary table 42 defining a lower altitude for the weight mechanism 30 than if the rotary table 42 were to be secured on top of the seat 41. Thus, the height or altitude of the laser indicator on the weight mechanism 30 can be adjusted by using the rotary table 42 alone, or both the rotary table 42 and the seat 41, to support the weight mechanism 30.

In summary, the center of the lens 3512 of the laser module according to the present invention is provided with a pivot axis for positioning so that the direction of the laser module may be rapidly adjusted by adjusting the adjusting bolts 354 located at the two sides of the laser module 351 for saving time and labor. In addition, the laser indicator of the present invention is provided with a detachable stand 40 that can be used to support the laser indicator at different altitudes. The weight mechanism 30 is positioned using a bearing set 36, so that the relative position between the weight mechanism 30 and the bearing stand 40 can remain fixed.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A multidirectional laser indicator, comprising:
   a weight mechanism having a bracket with a weight secured to the bracket in a manner where the weight is suspended by gravity, the weight having a bottom with an axial line;
   a plurality of laser generators arranged about the weight, including:
   a. a horizontal beam generator;
   b. a center laser generator arranged at the axial center of the bottom of the weight for emitting a laser point coaxial to the axial line of the weight; and
   c. a plurality of vertical beam generators positioned in spaced-apart manner around the axial center of the weight at the top of the weight;
   wherein each of the vertical beam generators has a supporting seat and a laser module positioned inside the supporting seat to project a laser beam parallel to the axial line of the weight, each laser module having a front portion, a lens, a pivot axis whose axial center extends toward the center of the lens of the respective laser module, and a plurality of adjusting bolts that extend through the respective supporting seat to contact against the respective laser module.

2. The laser indicator of claim 1, wherein the front portion of each laser module is positioned using the pivot axis such that, when the adjusting bolts of the particular laser module are rotated, the laser module will rotate about the pivot axis so as to adjust a projecting angle of the laser beam being emitted.

3. The laser indicator of claim 1, wherein the pivot axis is a pivot bolt that extends through the supporting seat, the pivot bolt having an end that contacts the laser module so that when the adjusting bolts of the laser module are rotated, the laser module will rotate using the contact point of the pivot bolt and the laser module as an axis.

4. The laser indicator of claim 1, wherein:
   the pivot axis of each vertical beam generator is provided at the bottom of the respective laser module, and an adjusting bolt is arranged at two sides of the laser module; and
   the pivot axis of the horizontal beam generator is provided at one side of the laser module, and an adjusting bolt is provided at a side that is opposite the one side of the respective laser module away from the pivot axis.

5. The laser indicator of claim 1, further including a stand that includes:
   a seat having a plurality of legs; and
   a rotary table having a plurality of legs, with the weight mechanism coupled to the rotary table, and the rotary table removably coupled to the seat so that the altitude of the weight mechanism can be adjusted.

6. The laser indicator of claim 1, wherein the bracket has an upper bracket, the laser indicator further including a securing mechanism for coupling the weight to the upper bracket, the securing mechanism including:
   a bearing set provided in the upper bracket and having an inner ring, an outer ring and a bearing retained between the inner ring and the outer ring;
   a movable axial center extending through the weight and the upper bracket, and having one end that abuts against the inner ring;
   a fixing bolt that fixes the movable axial center securely in the weight; and
   a fixing ring that is abutted against the exterior of the outer ring.

7. The laser indicator of claim 1, wherein the laser beams emitted by the vertical beam generators intersect each other at the axial line at the top of the weight mechanism.

* * * * *